Patented Dec. 29, 1936

2,065,724

UNITED STATES PATENT OFFICE 2,065,724

MANUFACTURE OF DEXTROSE

William B. Newkirk, Western Springs, Ill., assignor to International Patents Development Company, Wilmington, Del., a corporation of Delaware No Drawing. Application February 2, 1934, Serial No. 709,479. Renewed September 14, 1935

3 Claims. (Cl. 127—61)

This invention relates to the production of a high purity crystalline dextrose, particularly anhydrous dextrose, from a starch converted dextrose solution, in accordance with the method of crystallizing the solution in a vacuum pan in counter-distinction to the method of crystallizing in a crystallizer at atmospheric pressure.

Certain methods for producing crystalline dextrose by the crystallization in the vacuum pan are disclosed and claimed in United States patent to William B. Newkirk, No. 1,722,761, July 30, 1929, and in application for patent of William B. Newkirk, filed July 19, 1930, Serial No. 469,267 (Patented October 9, 1934 as No. 1,976,361).

The methods disclosed in the aforesaid patent and application for patent contemplate, particularly, the use of a vacuum pan constructed so that the vacuum may be readily varied to vary the temperature of the batch. One of the objects of the present invention is to adapt the process to a vacuum pan of the type which is intended to be operated at, and capable, possibly, of being operated only at a relatively constant vacuum.

Another object of the present invention is to increase the yield of crystals from any given batch of converter liquor by decreasing the dextrose content of the solution at the end of the crystallizing operation. This improvement may be employed either with a vacuum pan in which the vacuum is capable of variation or with a vacuum pan operating at a constant vacuum.

The process, as described in the aforesaid patent and application, contemplates three operating stages carried out in the vacuum pan: First, a concentrating stage at which a charge of the converted liquor, after suitable purification, is concentrated to the point of induction of crystals; second, an induction or graining stage at which a body of nucleus crystals is formed in this initial batch of solution; and third, a building up stage at which the crystallization of the dextrose out of solution is controlled so that it goes to build up the already formed crystals without induction of any substantial quantity of new crystals. To stop the induction of crystals at the end of the second stage, the aforesaid Patent 1,722,761 provides for inducing at once a relatively large charge of fresh liquor which so decreases the super-saturation as to put a stop to the formation of new crystals without, however, preventing the depositing out of solution of dextrose on the already formed crystals. In accordance with one of the improvements of the aforesaid pending applications the formation of new crystals is prevented by a sharp rise of temperature brought about by reducing the vacuum in the pan. In order to increase the yield of crystals, the process described in the pending application, provides for a gradual reduction in temperature, by increase in the intensity of the vacuum, toward the end of the third stage of the process. This tends to lower a crystallizing supersaturation in the batch at the end of the crystallizing operation.

There are certain economical advantages, however, in using for this operation a vacuum pan which operates at a constant, or relatively constant vacuum, that is to say a vacuum pan which is not constructed for arbitrary adjustment of the vacuum.

When a vacuum pan of this sort is employed, the expedient of the aforesaid Patent 1,722,761 for stopping induction at the end of the graining stage is employed. That is, a relatively large amount of fresh liquor is introduced which reduces the supersaturation of the batch. To make possible the gradual reduction of temperature during the third or building up stage, the expedient, according to the present invention, is used of adding the charges of fresh liquor to the pan—all of these methods contemplating graining a relatively small charge and adding fresh liquor to the pan after the crystallization process—at a rate faster than the water content of such liquor can be evaporated while still maintaining a crystallizing supersaturation. This gradually reduces the boiling point of the solution and therewith its temperature.

In order to still further increase yield, the present invention contemplates adding water instead of sugar liquor to the solution when the crystallization has been carried as far as possible on a liquor feed and continuing the boiling; that is, when, except for the addition of the water, the crystallizing operation would have been brought to completion. The substitution of water for liquor permits the continuation of crystallization giving a greater dry substance yield and a mother liquor of low supersaturation. This addition of water by reducing the boiling point effects a further reduction of temperature and prolongs the period in which crystallization is maintained. The process may be carried on until supersaturation approaches the zero point.

This dilution of the massecuite with water at the end of the third stage is an improvement useable with a vacuum pan, operating to maintain different vacuums as well as with a vacuum pan operating at a constant vacuum.

The following is a description of a preferred method of practicing the invention with the use of a constant pressure vacuum pan.

Dextrose hydrate sugar of about 99% purity or better, made for example in accordance with the processes described in the Newkirk Patents 1,471,347, October 23, 1923, and 1,521,830, January 6, 1925, is melted with water giving a solution of 25° to 30° Baumé. A portion of this solution sufficient to be 20% to 30% of the total, when grained, is introduced into the vacuum pan and concentrated at a vacuum of 27 inches of mercury, a temperature from 150° to 160° Fahrenheit, until it reaches a gravity of 46° Baumé or higher, at about which time graining will start. The boiling is continued for about thirty minutes, which under ordinary circumstances will give the proper number of nucleus crystals.

A comparatively large charge of fresh solution is then introduced into the vacuum pan, 5% or more of the original batch of solution. This reduces the temperature to about 140°-145° Fahrenheit. The boiling is continued and the rest of the solution is added in such quantities and at such intervals as will effect a gradual increase in the water content of the solution. That is, the fresh solution is added at a rate which is faster than the rate at which the water can be evaporated at the vacuum at which the pan is designed or set to operate. This brings about a gradual reduction of the boiling point and of the temperature of the mass. The aim is to reduce the temperature to as near 125° Fahrenheit as possible, with an ultimate reduction of supersaturation to the zero point.

If this is not possible, water is added to the solution to bring about a further reduction of boiling point and temperature and a resultant increase in yield.

It will be understood that the method as above described is merely typical and illustrative. It is applicant's intention to cover all modifications within the scope of the appended claims.

I claim:

1. Method of producing by crystallization in a vacuum pan a high purity crystalline dextrose from a starch converted dextrose solution which comprises adding water to the batch near the end of the crystallizing operation to dilute the batch and completing the boiling with the solution thus diluted.

2. In the method of producing by crystallization in a vacuum pan a high purity crystalline dextrose from a starch converted dextrose solution which comprises an induction stage during which a body of nucleus crystals is formed and a building up stage during which dextrose is deposited from the solution upon the already formed nucleus crystals; the improvement which consists in maintaining a relatively constant vacuum during the building up stage and bringing about a gradual reduction of temperature, as the operation proceeds, by adding fresh solution to the batch at a rate faster than the rate at which the water content of such solution is evaporated, so as to gradually reduce the boiling point of the solution.

3. Method of producing by crystallization in a vacuum pan a high purity crystalline dextrose from a starch converted dextrose solution which comprises maintaining a relatively constant vacuum during the stage at which the dextrose is deposited from solution on the nucleus crystals, bringing about reduction of temperature, as the operation proceeds, by adding fresh solution to the batch at a rate faster than the rate at which the water content of such solution is evaporated, so as to gradually reduce the boiling point of the solution, and finally, near the end of the operation, adding water to the batch and continuing the boiling.

WILLIAM B. NEWKIRK.